(12) United States Patent
Wraight et al.

(10) Patent No.: US 9,372,277 B2
(45) Date of Patent: Jun. 21, 2016

(54) NEUTRON POROSITY DOWNHOLE TOOL WITH IMPROVED PRECISION AND REDUCED LITHOLOGY EFFECTS

(75) Inventors: Peter Wraight, Skillman, NJ (US); James Thornton, East Windsor, NJ (US); Bradley A. Roscoe, Cambridge, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 7 days.

(21) Appl. No.: 12/764,814

(22) Filed: Apr. 21, 2010

(65) Prior Publication Data

US 2011/0260044 A1   Oct. 27, 2011

(51) Int. Cl.
*G01V 5/10* (2006.01)
(52) U.S. Cl.
CPC ..................................... *G01V 5/107* (2013.01)
(58) Field of Classification Search
CPC ..................................................... G01V 5/107
USPC ................. 702/8; 250/252.1, 264, 266, 269.4
See application file for complete search history.

(56) References Cited

U.S. PATENT DOCUMENTS

| 4,760,252 | A | * | 7/1988 | Albats et al. ............. 250/390.07 |
| 4,786,796 | A | | 11/1988 | Flaum et al. |
| 4,794,792 | A | | 1/1989 | Flaum et al. |
| 4,909,075 | A | * | 3/1990 | Flaum et al. ................ 73/152.05 |
| 5,051,581 | A | | 9/1991 | Hertzog et al. |
| 5,349,184 | A | * | 9/1994 | Wraight ........................ 250/266 |
| 5,532,482 | A | * | 7/1996 | Stephenson ................ 250/269.4 |
| 5,596,191 | A | * | 1/1997 | Mickael ..................... 250/269.4 |
| 5,767,510 | A | * | 6/1998 | Evans ........................ 250/269.1 |
| RE36,012 | E | * | 12/1998 | Loomis et al. ............. 250/269.4 |
| 6,032,102 | A | * | 2/2000 | Wijeyesekera et al. ........... 702/8 |

(Continued)

FOREIGN PATENT DOCUMENTS

| EP | 0677754 A1 | 10/1995 |
| RU | 2010958 C1 | 4/1994 |
| RU | 2025748 C1 | 12/1994 |
| WO | 8707733 A1 | 12/1987 |
| WO | 2010002796 A2 | 1/2010 |

OTHER PUBLICATIONS

A. Mendoza et al., Environmental and Petrophysical Effects on Density and Neutron Porosity Logs Acquired in Highly Deviated Wells, SPWLA 47th Annual Logging Symposium, Jun. 4-7, 2006, 11 pp.*

(Continued)

*Primary Examiner* — Alexander Satanovsky
(74) *Attorney, Agent, or Firm* — Michael Dae

(57) ABSTRACT

Systems and methods for neutron porosity well logging with high precision and reduced lithology effects are provided. In accordance with an embodiment, a downhole neutron porosity tool may include a neutron source, a neutron monitor, a neutron detector, and data processing circuitry. The neutron source may emit neutrons into a subterranean formation while the neutron monitor detects a count of neutrons proportional to the neutrons emitted. The neutron detector may detect a count of neutrons that scatters off the subterranean formation. The data processing circuitry may determine an environmentally corrected porosity of the subterranean formation based at least in part on the count rate of neutrons scattered off the subterranean formation normalized to the count rate of neutrons proportional to the neutrons emitted by the neutron source.

15 Claims, 9 Drawing Sheets

(56) References Cited

U.S. PATENT DOCUMENTS

| | | | |
|---|---|---|---|
| 6,648,083 B2* | 11/2003 | Evans et al. ............... | 175/41 |
| 6,754,586 B1 | 6/2004 | Adolph et al. | |
| 6,884,994 B2 | 4/2005 | Simonetti et al. | |
| 7,148,471 B2 | 12/2006 | Roscoe et al. | |
| 7,309,983 B2 | 12/2007 | Freedman | |
| 7,365,307 B2 | 4/2008 | Stoller et al. | |
| 7,667,192 B2 | 2/2010 | Fricke et al. | |
| 8,000,899 B2* | 8/2011 | Stoller et al. ............... | 702/8 |
| 2004/0178337 A1 | 9/2004 | Kurkoski et al. | |
| 2006/0226351 A1* | 10/2006 | Stoller et al. ............... | 250/269.1 |
| 2007/0057171 A1* | 3/2007 | Stoller et al. ............... | 250/253 |
| 2009/0057545 A1* | 3/2009 | Saenger et al. ............ | 250/269.4 |

OTHER PUBLICATIONS

International Search Report and the Written Opinion dated Dec. 15, 2011 for corresponding PCT Application No. PCT/US2011/032210 filed Apr. 13, 2011.
Extended European Search Report for European Application No. 11772446.8 dated Oct. 2, 2013.
Russian Decision on Grant and Report on Examination Results for Russian Application No. 2012149430 dated Dec. 11, 2013.
European Examination Report for European Application No. 11 772 446.8 dated Oct. 10, 2014.
Office Action issued in EP application 11772446.8 on Aug. 7, 2015, 8 pages.

* cited by examiner

NEUTRON POROSITY DOWNHOLE TOOL WITH IMPROVED PRECISION AND REDUCED LITHOLOGY EFFECTS

BACKGROUND

The present disclosure relates generally to neutron well logging and, more particularly, to a neutron porosity downhole tool employing a neutron monitor for improved precision and reduced lithology effects.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Downhole tools for neutron well logging have been used in oilfield settings for many years to measure formation porosity and as gas and lithology indicators. These downhole tools have historically included a radioisotopic neutron source, such as AmBe, which emits neutrons into the surrounding formation. The neutrons may interact with the formation before being subsequently detected in neutron count rates by one or more neutron detectors. Among other things, the neutron count rates may be sensitive to hydrogen in formation pore spaces. In general, the more hydrogen there is in the formation, the fewer neutrons arrive at the detector. Since formation porosity is generally water or hydrocarbon-filled, the neutron count rates may be employed to determine a porosity of the formation.

When a radioisotopic source is employed by a downhole neutron porosity tool, porosity may be determined based on the detector count rate normalized to the neutron output of the source, which may be predictable. Indeed, it may be sufficient to perform a one-time calibration to determine the neutron output of the radioisotopic source if it has a sufficiently long half life as in the case of $^{241}$AmBe. Thereafter, any change in the future can, in principle, be predicted from the known half-life of the radioisotopic material. However, a radioisotopic neutron source may be undesirable for a variety of reasons. For example, the use of a radioisotopic source may involve negotiating burdensome regulations and the sources may have limited useful lives (e.g., 1 to 15 years). Moreover, radioisotopic sources are becoming more expensive and more difficult to obtain.

Alternative neutron sources, such as electronic neutron generators, may be used in place of a radioisotopic neutron source in a neutron porosity tool. However, in contrast to the predictable output of a radioisotopic neutron source, the output of an electronic neutron generator may be difficult or impossible to predict from the operating parameters of the tool. For this reason, neutron generator-based devices may generally determine porosity from a ratio of count rates from detectors at different spacing (e.g., a near/far count rate ratio) in order to cancel out any variations in the output of the neutron source. While this method may achieve its stated goal and may introduce certain other positive effects (e.g., reducing the device's sensitivity to several borehole effects unrelated to porosity), it also may reduce the porosity sensitivity of the tool, since some of the individual detectors' sensitivity also may be canceled out in the ratio. This reduction in sensitivity may be especially problematic when using the deuterium-tritium (d-T) reaction-based neutron generators generally employed in the oilfield. These generators produce 14 MeV neutrons, more than twice the average energy of neutrons from an AmBe source. Used in a device with typical near and far source-detector spacings of around 1 and 2 feet, respectively, this higher neutron source energy results in a dramatic drop in porosity sensitivity at high porosity compared to an AmBe-based device.

To mitigate the above concerns, certain neutron porosity tools that would measure porosity based on a single neutron count rate relative to the monitored output of such an electronic neutron source might have been contemplated in the past. However, at the time such tools would have been considered, they would have produced porosity values with excessive environmental effects. To compensate for these environmental effects, some sources suggested increasing the spacing between the neutron source and the neutron detector in such a neutron porosity tool. While doing so could reduce the environmental effects of measurements in the contemplated tools, increasing the source-detector spacing has been shown to increase the lithology effect.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems and methods for neutron porosity well logging with high precision and reduced lithology effects. In accordance with an embodiment, a downhole neutron porosity tool may include a neutron source, a neutron monitor, a neutron detector, and data processing circuitry. The neutron source may emit neutrons into a subterranean formation while the neutron monitor detects a count of neutrons proportional to the neutrons emitted. The neutron detector may detect a count of neutrons that scatters off the subterranean formation. The data processing circuitry may determine an environmentally corrected porosity of the subterranean formation based at least in part on the count rate of neutrons scattered off the subterranean formation normalized to the count rate of neutrons proportional to the neutrons emitted by the neutron source.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
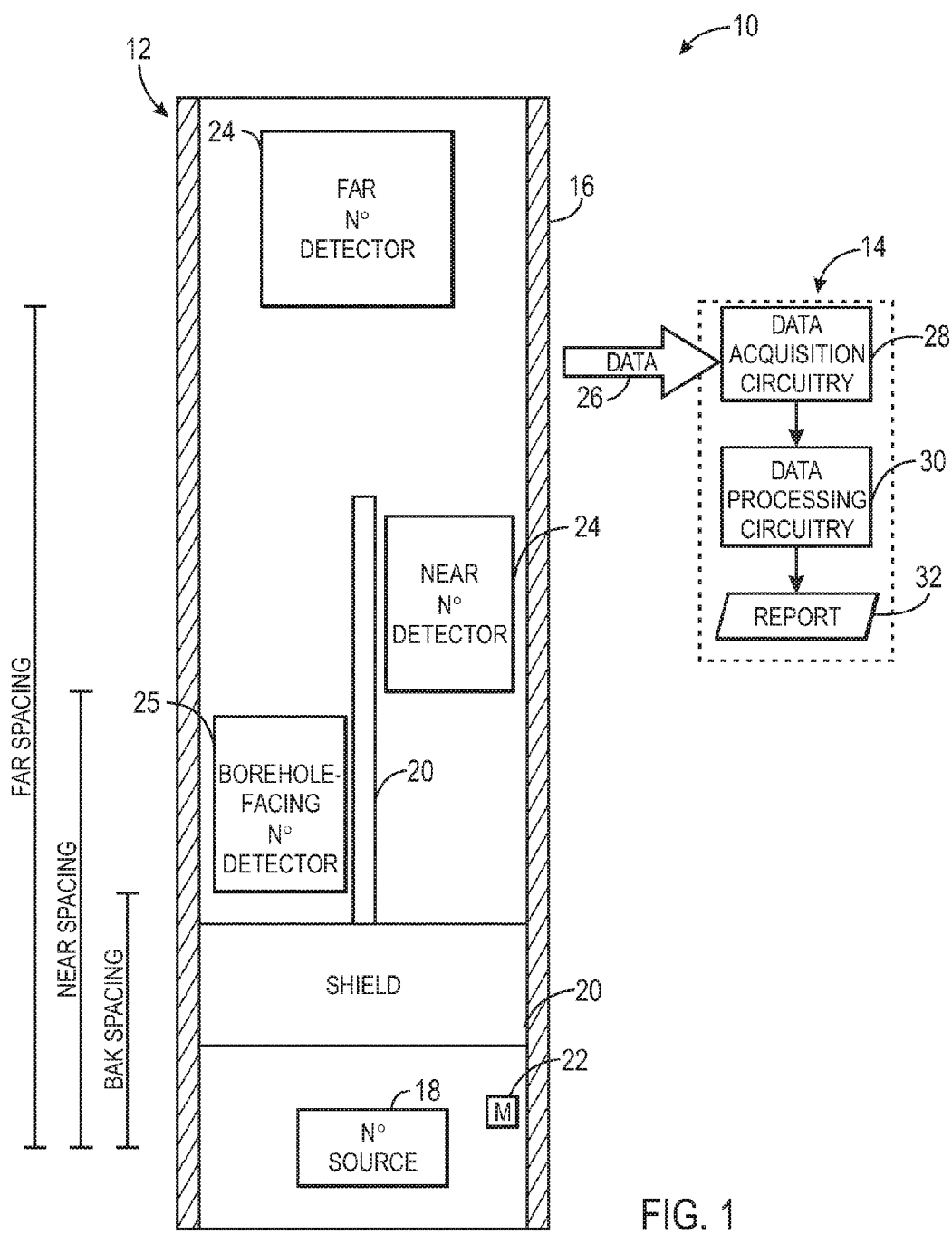
FIG. 1 is a schematic block diagram of a neutron porosity well logging system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments relate to downhole neutron porosity tools having improved precision and reduced lithology effects through the use of a neutron monitor. The neutron monitor may be a neutron detector employed by the downhole neutron porosity tool for the express purpose of measuring the neutron source output. In particular, traditional neutron porosity devices employ low-energy neutron detectors, since it is through the very process of the neutrons slowing down from high to low energy that the porosity sensitivity arises. In accordance with present embodiments, however, if a high-energy neutron monitor (e.g., a neutron detector capable of detecting neutrons of greater than 1 MeV) is added to the device, in one embodiment close to the neutron source, then its count rate can be used as a direct measure of the source neutron output. Indeed, the count rate from the (high-energy) neutron monitor may be essentially unperturbed by environmental effects from the borehole and the formation, since almost all of the neutrons counted by the detector will have undergone no scattering before reaching the neutron monitor. By normalizing the count rate of low-energy neutron detectors at farther spacings, which may measure scattered and typically low energy neutrons, to the count rate of the neutron monitor, it may be possible to correct for neutron source output variations without canceling out any porosity sensitivity, and thus preserve the (higher) individual low-energy neutron detector porosity sensitivities.

Another advantage of normalizing the low-energy neutron detector count rate to the neutron source output as determined by the neutron monitor relates to the sensitivity of the measurement to elements other than hydrogen. Generally, neutron porosity devices may first compute an apparent porosity from the measured count rates or count rate ratios assuming a standard set of downhole conditions (e.g., calcite formation, 8 inch borehole, fresh water borehole and formation fluids, 20 C, 1 atm, etc.). Any deviations between this apparent porosity and the true porosity are referred to as environmental effects. In particular, deviations caused by the presence of a formation lithology other than the nominal one, often taken to be calcite, may be referred to as the lithology effect. This lithology effect is dependent on the source-detector spacing and can be reduced for epithermal detectors by choosing an appropriate spacing. With a traditional porosity measurement, using the count rate ratio of two low-energy neutron detectors, only one of the low-energy neutron detectors will be at the optimal spacing. Thus, a lithology effect may be reintroduced through the non-optimally spaced detector in the ratio. By forming the count rate ratio of the optimally spaced detector to a neutron monitor, this problem may be avoided and only the much smaller lithology effect of the optimally placed detector may remain.

In accordance with certain other present embodiments, the use of a neutron monitor to normalize the neutron generator output also may allow certain vertical resolution enhancing techniques in combination with a downhole neutron porosity tool having a variable-output neutron source, such as an electronic neutron generator. The vertical resolution enhancing techniques may involve alpha processing, which is described in detail in U.S. Pat. No. 4,786,796 to Flaum et al., assigned to Schlumberger Technology Corporation, which is incorporated by reference herein in its entirety. Normalizing the count rates of low-energy neutron detectors to the count rate of the neutron monitor may enable the use of such vertical resolution enhancing effects, which would otherwise fail due to the inability to tell depth related count rate changes from those caused by variations in neutron source output.

It should further be noted that determining porosity based on a neutron detector count rate normalized to a neutron monitor count rate may provide a dramatic improvement in operational efficiency. In particular, the presently disclosed techniques may reduce statistical error in porosity precision and by a statistical factor of 2. Since otherwise reducing the statistical error by a factor of 2 may require increasing the measurement time by a factor of 4, the improvement in precision utilizing the present techniques may be considered equivalent to a potential increase in logging speed by a factor of 4 to achieve the same statistical precision that would have been achieved using a ratio porosity measurement.

With the foregoing in mind, FIG. 1 illustrates a neutron well logging system 10 for determining a porosity of a subterranean formation with high precision as well as reduced lithology effects. The neutron well logging system 10 may include a downhole tool 12 and a data processing system 14. Although the downhole tool 12 and the data processing system 14 are illustrated as separate from one another, the data processing system 14 may be incorporated into the downhole tool 12 in certain embodiments. By way of example, the downhole tool 12 may be a slickline or wireline tool for logging an existing well, or may be installed in a borehole assembly (BHA) for logging while drilling (LWD).

The downhole tool 12 may be encased within a housing 16 that houses, among other things, a neutron source 18. The neutron source 18 may include a neutron source capable of emitting relatively high-energy neutrons, such as 14 MeV neutrons. By way of example, the neutron source 18 may be an electronic neutron source, such as a Minitron™ by Schlumberger Technology Corporation, which may produce pulses of neutrons or a continuous stream of neutrons via d-T reactions. Additionally or alternatively, the neutron source 18 may include a radioisotopic source, which may or may not emit neutrons at a variable or unpredictable rate. Neutron shielding 20 may separate the neutron source 18 from other components of the downhole tool 12.

As noted above, the downhole tool 12 may include a neutron monitor 22. The neutron monitor 22 may measure the output of the neutron source 18 to provide a basis for normalizing the neutron counts detected by other neutron detectors 24, as discussed below, which may measure neutrons scattered by a surrounding formation. In general, the neutron monitor 22 may be any suitable neutron detector in any suitable configuration within the downhole tool 12 that effectively measures substantially only neutrons emitted by the neutron source 18 that have not been scattered by the surrounding formation. Thus, the neutron monitor 22 may be sensitive only to high-energy neutrons (e.g., of greater than 1 MeV and/or of energy levels roughly equal to that emitted by the electronic neutron source 18), may be located very close to the neutron source 18, and/or may be well-shielded from neutrons returning to the downhole tool 12 from the surrounding formation.

In some embodiments, the neutron monitor 22 may include a plastic scintillator coupled to a photomultiplier. Such a plastic scintillator may be described by U.S. Pat. No. 6,884, 994 to Simonetti et al., assigned to Schlumberger Technology Corporation, which is incorporated by reference herein in its entirety. In other embodiments, the neutron monitor 22 may include other detectors of fast neutrons, such as He-4 gas counters, hydrogen proportional counters, liquid scintillators, or solid state detectors such as SiC or diamond.

The downhole tool 12 may include at least one low-energy neutron detector 24. In the embodiment of the downhole tool 12 illustrated in FIG. 2, a "near" neutron detector 24 is located more closely to the neutron source 18 than a similar "far" neutron detector 24. In some embodiments, the downhole tool 12 may also contain additional low-energy neutron detectors 24 at intermediate spacings between "near" and "far." If the downhole tool 12 includes only one neutron detector 24, a "far" neutron detector 24 spaced around 1 foot from the neutron source 18 generally may provide a more accurate measurement of porosity. If the downhole tool 12 includes both near and far neutron detectors 24, certain vertical resolution enhancing techniques, such as alpha processing, may be employed by the data processing system 14.

The downhole tool 12 may further include one or more borehole-facing neutron detectors 25 in certain embodiments. The borehole-facing neutron detector 25 may be more sensitive to neutrons that arrive via the borehole than the near and far neutron detectors 24. As such, neutron count rates obtained from the borehole-facing neutron detector 25 may be employed to correct for environmental effects related to borehole fluid composition and/or borehole geometry, as discussed in greater detail in U.S. patent application Ser. No. 12/729,384, filed on Mar. 23, 2010 and assigned to Schlumberger Technology Corporation, which is incorporated by reference herein in its entirety. In alternative embodiments, the downhole tool 12 may not include the borehole-facing neutron detector 25, but may still employ other techniques to correct for environmental effects associated with the borehole. Such techniques may include, among other things, measuring the epithermal slowing down time to correct for standoff, which may correlate with certain environmental effects. These other techniques may be employed alone or in combination with measurements from the borehole-facing neutron detector 25 to reduce the environmental effects to produce a meaningful porosity measurement with reduced lithology effects.

In some embodiments, neutron shields 20 also may be placed between the neutron detectors 24 and the borehole-facing side of the downhole tool 12. These neutron shields 20 may reduce the number of neutrons that may reach the neutron detectors 24 via the borehole, versus those reaching the detector via the formation, thereby increasing the sensitivity of the downhole tool 12 to formation properties versus those of the borehole. Additionally, the placement of the neutron shields 20 may increase the number of neutrons that may reach the borehole-facing neutron detector 25 via the borehole.

In certain embodiments, the neutron detectors 24 and 25 may be any neutron detectors capable of detecting thermal and/or epithermal neutrons. In some embodiments, the neutron detectors 24 and 25 may also be relatively insensitive to high energy neutrons, such as those emitted by the neutron source 18. In general, the neutron detectors 24 and 25 may be configured substantially not to detect neutrons having an energy, for example, of 1 keV or greater. In some embodiments, the neutron detectors 24 and 25 may be $^3$He neutron detectors. In certain other embodiments, the neutron detectors 24 and 25 may be capable of detecting epithermal neutrons, but similarly may be relatively insensitive to the high energy neutrons emitted by the neutron source 18.

The near neutron detector 24 may have a "near spacing" measured from the neutron source 18 to the face of the active region of the near neutron detector 24 nearest to the neutron source 18, and the far neutron detector 24 may have a "far spacing" measured from the neutron source 18 to the face of the active region of the far neutron detector 24 nearest to the neutron source 18. The borehole-facing neutron detector 25 may have a "back spacing" that is nearer to the neutron source 18 than either the front spacing or the back spacing. In general, the far spacing may be selected such that porosities computed based on the far neutron detector 24 count rate normalized to the neutron monitor 22 have a relatively high accuracy under a standard set of conditions (e.g., calcite formation, 8 inch borehole, fresh water borehole and formation fluids, 20 C, 1 atm, etc.), upon which an apparent porosity relationship may be based. For example, such a far spacing may be approximately 2 feet. The near neutron detector 22 may have a near spacing that enables the extraction of enhanced vertical resolution information when a porosity computed based on its normalized count rate is employed in combination with the porosity computed from that of the far neutron detector 24. For example, such a near spacing may be approximately 1 foot.

In certain alternative embodiments, the near spacing may be much closer than many traditional configurations. Indeed, in such embodiments, the near spacing may be chosen such that, at low porosities, many of the neutrons that reach the near neutron detector 22 either directly from the neutron source or after interacting with the subterranean formation, borehole and/or within the device itself have energies too high to detect. At relatively higher porosities, due to the additional scattering off of hydrogen nuclei, the number of lower-energy, detectable neutrons may increase, as the distance the neutrons travel before being slowed to these energies decreases. At higher porosities still, the additional scattering off hydrogen may eventually reduce the number of neutrons of any energy that reach the detector, but not before resulting in a porosity response that is relatively flat or even increasing over part of the porosity range. For a given embodiment of the downhole tool 12, the exact optimal spacing will depend on specific details of the design of the downhole tool 12, including the size and efficiency versus energy of the neutron detector 24, and where, what kind, and how much neutron shielding is used. The near neutron detector 24 may be spaced such that its porosity response may be relatively flat and/or increasing as porosity increases. Such a spacing may enable a high porosity sensitivity, as discussed in greater detail in U.S. Provisional Patent Application 61/115,670, filed on Nov. 17, 2009 and assigned to Schlumberger Technology Corporation, which is incorporated by reference herein in its entirety.

When the downhole tool is used in a subterranean formation, as generally described below with reference to FIG. 2, the neutron detectors 24 may detect a quantity of neutrons that varies depending on the output of the neutron source 18 and the porosity of the formation, among other things. Thus, the responses of the neutron monitor 22 and the neutron detectors 24 may be transferred as data 26 to the data processing system 14. By computing porosity based on the response of one of the neutron detectors 24 normalized to the response of the neutron monitor 22, the porosity sensitivity of the one of the neutron detectors 24 may be preserved in the computed porosity. Moreover, the porosity may be corrected for environmental effects based on a variety of techniques, such as by measuring epithermal neutron slowing down time to correct for the standoff of the downhole tool 12 or by measuring neutrons from the borehole-facing neutron detector 25.

The data processing system 14 may include a general-purpose computer, such as a personal computer, configured to run a variety of software, including software implementing all or part of the present techniques. Alternatively, the data processing system 14 may include, among other things, a mainframe computer, a distributed computing system, or an application-specific computer or workstation configured to implement all or part of present techniques based on specialized software and/or hardware provided as part of the system. Further, the data processing system 14 may include either a single processor or a plurality of processors to facilitate implementation of the presently disclosed functionality. For example, processing may take place at least in part by an embedded processor in the downhole tool 12.

In general, the data processing system 14 may include data acquisition circuitry 28 and data processing circuitry 30. The data processing circuitry 30 may be a microcontroller or microprocessor, such as a central processing unit (CPU), which may execute various routines and processing functions. For example, the data processing circuitry 30 may execute various operating system instructions as well as software routines configured to effect certain processes. These instructions and/or routines may be stored in or provided by an article of manufacture, which may include a computer readable-medium, such as a memory device (e.g., a random access memory (RAM) of a personal computer) or one or more mass storage devices (e.g., an internal or external hard drive, a solid-state storage device, CD-ROM, DVD, or other storage device). In addition, the data processing circuitry 30 may process data provided as inputs for various routines or software programs, including the data 26.

Such data associated with the present techniques may be stored in, or provided by, a memory or mass storage device of the data processing system 14. Alternatively, such data may be provided to the data processing circuitry 30 of the data processing system 14 via one or more input devices. In one embodiment, data acquisition circuitry 28 may represent one such input device; however, the input devices may also include manual input devices, such as a keyboard, a mouse, or the like. In addition, the input devices may include a network device, such as a wired or wireless Ethernet card, a wireless network adapter, or any of various ports or devices configured to facilitate communication with other devices via any suitable communications network, such as a local area network or the Internet. Through such a network device, the data processing system 14 may exchange data and communicate with other networked electronic systems, whether proximate to or remote from the system. The network may include various components that facilitate communication, including switches, routers, servers or other computers, network adapters, communications cables, and so forth.

The downhole tool 12 may transmit the data 26 to the data acquisition circuitry 28 of the data processing system 14 via, for example, internal connections within the downhole tool 12 or the downhole tool 12 string, a telemetry system communication to the surface (uplink) through a cable or other means of downhole-to-surface communication, or a communication cable or other communication link that may connect the surface unit to a unit in a different location. After receiving the data 26, the data acquisition circuitry 28 may transmit the data 26 to the data processing circuitry 30. In accordance with one or more stored routines, the data processing circuitry 30 may process the data 26 to ascertain one or more properties of a subterranean formation surrounding the downhole tool 12, such as porosity. Such processing may involve, for example, determining a porosity based on the neutron count of the far neutron detector normalized to the neutron count of the neutron monitor. Additionally or alternatively, the processing may involve performing a vertical resolution enhancing technique. The vertical resolution enhancing technique may include alpha processing a porosity computed based on the normalized near detector count rate. The data processing circuitry 30 may thereafter output a report 32 indicating the one or more ascertained properties of the formation. The report 32 may be stored in memory or may be provided to an operator via one or more output devices, such as an electronic display and/or a printer.

Figure 2:
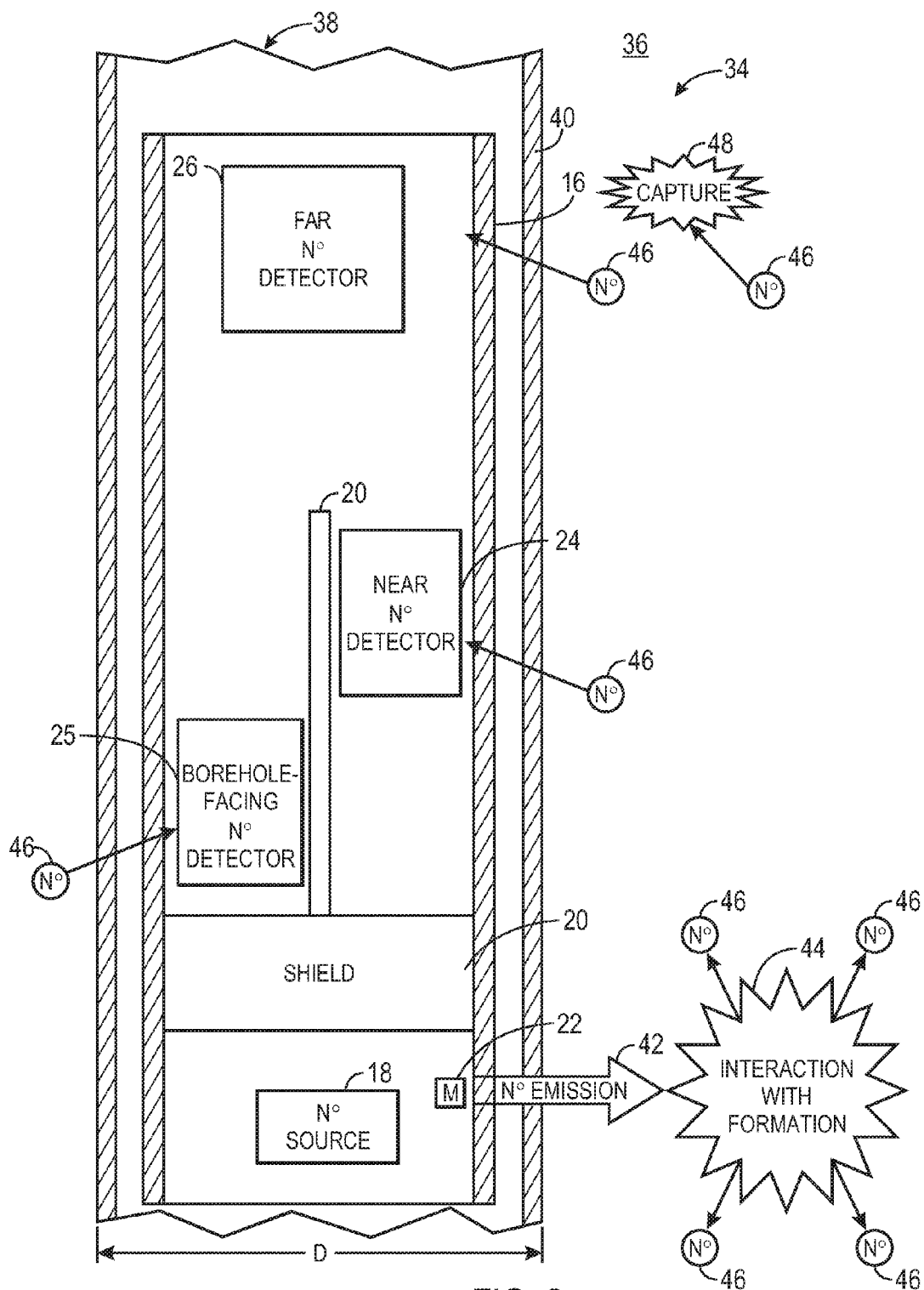
FIG. 2 is a schematic diagram illustrating a neutron porosity well logging process using the system of FIG. 1, in accordance with an embodiment.

FIG. 2 represents a well logging operation 34 using the downhole tool 12 to ascertain a porosity of a subterranean formation 36. As illustrated in FIG. 2, the downhole tool 12 may be lowered into a borehole 38 in the subterranean formation 36, which may or may not be cased in a casing 40. The borehole 38 may have a diameter D, which may impact the neutron counts detected by the downhole tool 12, as discussed below. After placement into the subterranean formation 36, a neutron emission 42 from the neutron source 18 may have various interactions 44 with elements of the subterranean formation 36 and/or the borehole 38. By way of example, when the neutron source includes an electronic neutron generator, the neutron emission 42 may be a neutron burst containing 14-MeV neutrons. The neutron monitor 22 may obtain a count of emitted neutrons that has not substantially interacted 44 with the subterranean formation 36. This count of emitted neutrons, which may be proportional to the total neutron emission 42, may form a basis upon which to normalize counts subsequently obtained by other neutron detectors 24 of the downhole tool 12.

The interactions 44 of the neutron emission 42 with elements of the subterranean formation 36 and/or the borehole 38 may include, for example, inelastic scattering, elastic scattering, and neutron capture. These interactions 44 may result in neutrons 46 from the neutron emission 42 traveling through the subterranean formation 36 or borehole 38 and reaching the neutron detectors 24 at lower energies than when first emitted. Depending on the composition of the subterranean formation 36, the borehole 38, and/or the downhole tool 12 itself, the interactions 44 may vary. For example, hydrogen atoms may cause elastic scattering. Similarly, chlorine atoms found in salt in the subterranean formation 36 or borehole fluid may cause neutron capture events 48 for certain of the neutrons 46 after the neutrons 46 have reduced in energy below approximately 0.1 eV. The numbers and energies of the neutrons 46 that reach the neutron detectors 24 at different distances from the neutron source 18 may thus vary based in part on properties of the subterranean formation 34, including, among other things, a porosity of the subterranean formation 36. Based on a count of neutrons 46 from the near neutron detector 24 and/or the far neutron detector 24 normalized to a count of neutrons from the neutron monitor 22, the data processing system 14 may ascertain the porosity of the subterranean formation 36 using any suitable technique.

Figure 3:
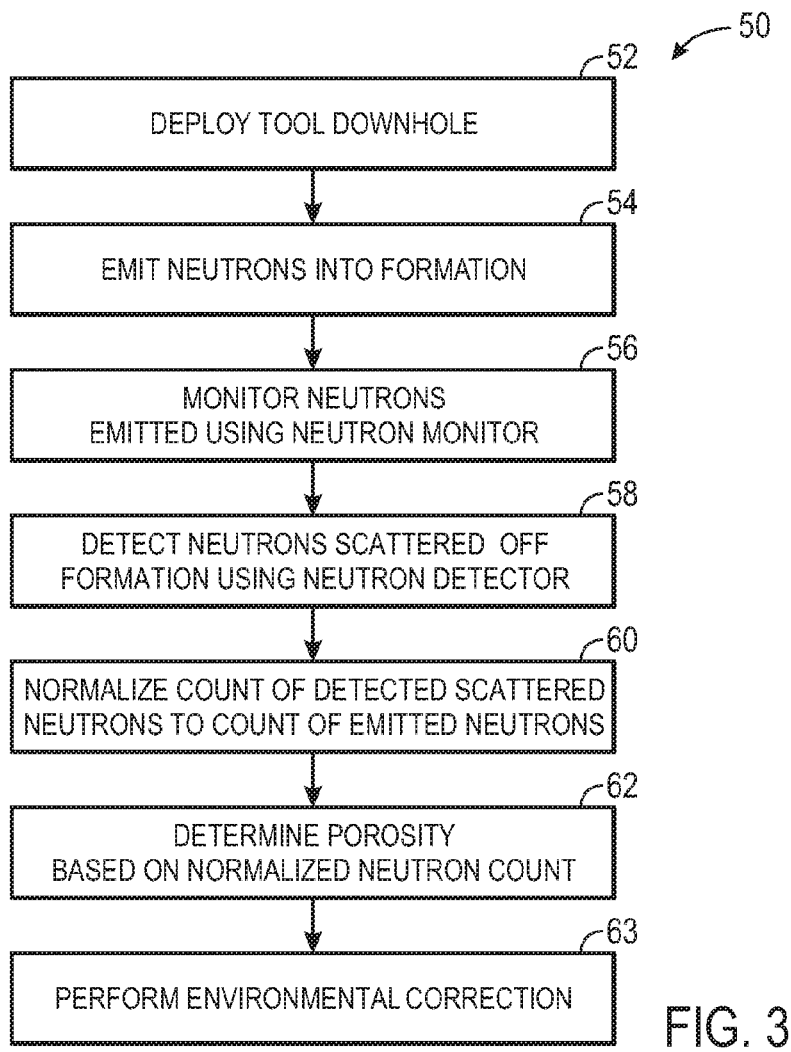
FIG. 3 is a flowchart describing an embodiment of a method for performing the neutron porosity well logging process of FIG. 2.

FIG. 3 is a flow chart 50 representing an embodiment of a method for performing the neutron well logging operation 34 of FIG. 2. In a first step 52, the downhole tool 12 may be deployed into the subterranean formation 36 on a wireline, slickline, or while the borehole 38 is being drilled by a borehole assembly (BHA). In step 54, the neutron source 18 may emit neutrons (illustrated as neutron emission 42 in FIG. 2) into the surrounding subterranean formation 36. The neutron emission 42 may be in bursts of neutrons or as a continuous stream of neutrons. As the neutrons are emitted into the subterranean formation 36, the neutron monitor 22 may detect a count of the emitted neutrons that is proportional to the total neutron emission 42 in step 56.

Based on the interactions 44 of the emitted neutrons 42 with elements of the subterranean formation 36, which may vary with porosity, varying numbers of neutrons may reach the neutron detectors 24. As such, in step 58, at least one neutron detector 24 may detect neutrons that have scattered off the subterranean formation 36. In step 60, the data processing system 14 may normalize the response of the at least one neutron detector 24 to the response of the neutron monitor 22 to obtain a normalized neutron count and, in step 62, the data processing system 14 may determine a porosity of the subterranean formation 36 based on the normalized neutron count. As noted above, the data processing system 14 may determine the porosity using any suitable technique. For example, the data processing system 14 may determine an apparent porosity from the normalized neutron count, upon which specific environmental corrections may be applied to determine the actual porosity. Additionally or alternatively, the data processing system 14 may determine the porosity at least in part using a transform derived from modeled and/or experimental data that relates the normalized neutron count to the porosity of a subterranean formation.

Without correction, the apparent porosity determined in step 62 may many undesirable environmental effects. These environmental effects may be much greater than those of porosities based on ratios of neutron count rates. Thus, in step 63, the data processing system 14 may undertake one or more correction schemes to eliminate some of the environmental effects from the porosity determined in step 62.

In some embodiments, the data processing system 14 may perform step 63 by applying environmental corrections based on distinctions between the neutron count rates from the front-facing neutron detector(s) 24 and the borehole-facing neutron detector 25. For example, the data processing system 14 may determine, based on neutron count rates obtained from the borehole-facing neutron detector 25 a back apparent porosity $\phi_{back}$ using any suitable techniques for computing porosity. With the porosity determined in step 62 from the front-facing neutron detector(s) 24, represented below as $\phi_{near}$, the data processing system 14 may compute a corrected porosity $\phi_{corr}$ based on a relationship between the near apparent porosity $\phi_{near}$ and the back apparent porosity $\phi_{back}$ and a corresponding true porosity. Such a relationship may include, for example, a polynomial in the apparent porosities:

$$\varphi_{corr} = \sum_{ij}^{i+j \leq n} a_{ij} \varphi_{near}^{i} \varphi_{back}^{j}, \quad (1)$$

where n is the degree of the polynomial and the coefficients $\alpha_{ij}$ have been chosen to minimize a difference between the corrected porosity $\phi_{corr}$ and a true porosity. In this minimization, the detector count rates and hence apparent porosities may be obtained experimentally or by way of computer modeling data. Although Equation (1) represents a polynomial function, it should be understood that any suitable functional form may be employed to compute the corrected porosity $\phi_{corr}$ in the manner described above. Additionally or alternatively, the data processing system 14 may determine the porosity directly from the neutron count rates using a transform derived from modeled and/or experimental data relating the epithermal neutron count rates to various borehole and formation conditions. Additionally or alternatively, the data processing system 14 may determine the corrected porosity by an inversion of a forward model giving the expected count rates (or apparent porosities) as a function of the true porosity and other formation 36 and borehole 38 conditions.

Additionally or alternatively, in step 63, the data processing system 14 may apply environmental corrections such as for standoff to the porosity determined in step 62 by computing an epithermal neutron slowing down time. These environmental corrections may be performed using any suitable technique, including those disclosed by U.S. Pat. No. 5,051,581, which is incorporated by reference herein in its entirety.

Figure 4:
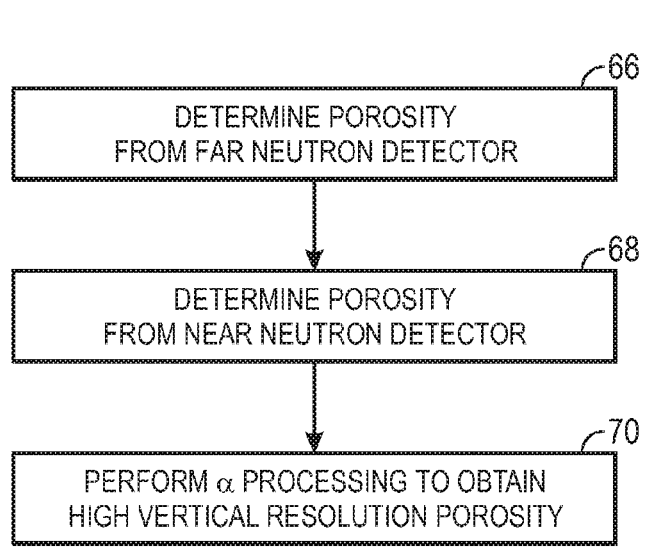
FIG. 4 is a flowchart describing an embodiment of another method for performing the neutron porosity well logging process of FIG. 2.

As noted above, when the downhole tool 12 includes at least two neutron detectors at different spacings (e.g., near and far neutron detectors 24), certain vertical resolution enhancing techniques may be employed. In particular, a flowchart 64 illustrated in FIG. 4 describes an embodiment of a method for obtaining a high vertical resolution porosity using the downhole tool 12 when the downhole tool 12 includes the near neutron detector 24 and the far neutron detector 24. In step 66, an "accurate" porosity may be determined based on the response of the far neutron detector 24 in the manner described above with reference to the flowchart 50 of FIG. 3. This porosity measurement may be termed "accurate" because the porosity from the far neutron detector 24 is likely to be more accurate than the porosity from the near neutron detector 24, but may have poorer vertical resolution. In step 68, a "less accurate" porosity with high vertical resolution may be determined based on the response of the near neutron detector 24 in a like manner. This porosity measurement may be termed "higher vertical resolution" because the porosity from the near neutron detector 24 is likely to have a higher vertical resolution than the porosity from the far neutron detector 24. In step 70, the data processing system 14 may perform alpha processing using the porosity measurements determined in steps 66 and 68 to obtain a high vertical resolution porosity measurement. As mentioned above, the techniques by which the data processing system 14 may perform alpha processing may be described in U.S. Pat. No. 4,786,796 to Flaum et al., assigned to Schlumberger Technology Corporation, which is incorporated by reference herein in its entirety.

FIGS. 5-16 represent plots comparing measurements associated with porosity based on a traditional ratio of near/far neutron detector 24 counts and based on the individual near and/or far neutron detector 24 counts normalized to the output of the neutron source 18 using the neutron monitor 22. These plots are intended to illustrate that the disclosed techniques involving normalized neutron detector 24 counts may provide porosity measurements with improved precision and reduced lithology effects as compared to traditional techniques. The plots illustrated in FIGS. 5-16 have been modeled using the Monte Carlo N-Particle transport code, (MCNP), a leading nuclear Monte Carlo modeling code. It should be appreciated that, among other things, detector size, neutron source strength, and shielding may vary in different embodiments of the well logging system 10; however, the use of the neutron monitor 22 to normalize the responses of the neutron detectors 24 generally may provide the benefits disclosed herein. As such, while these variables may influence the absolute count rates modeled by the plots of FIGS. 5-16, the relative shape of the responses generally may remain the same.

Figure 5:
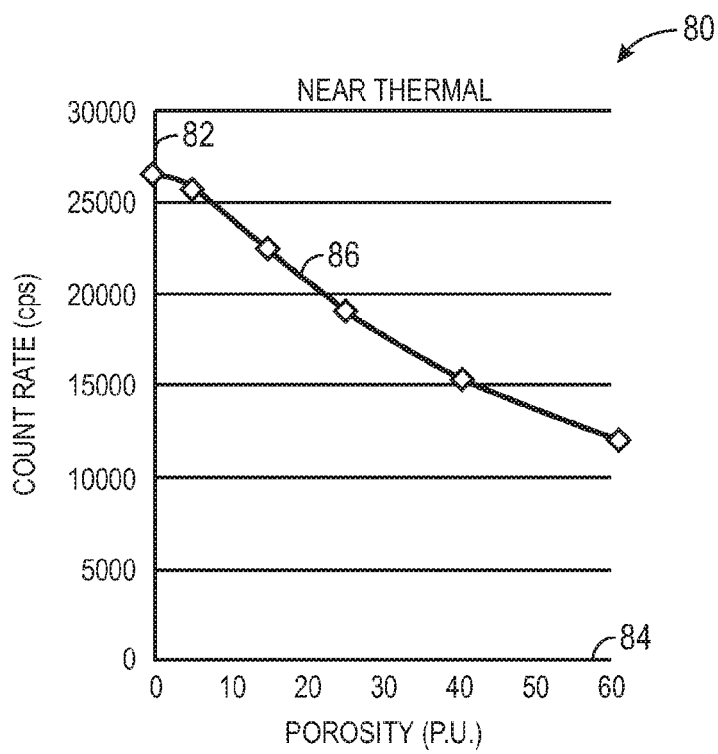
FIGS. 5-10 are plots modeling exemplary neutron counts obtained from individual neutron detectors and ratios of neutron detectors, in accordance with an embodiment.
Figure 6:
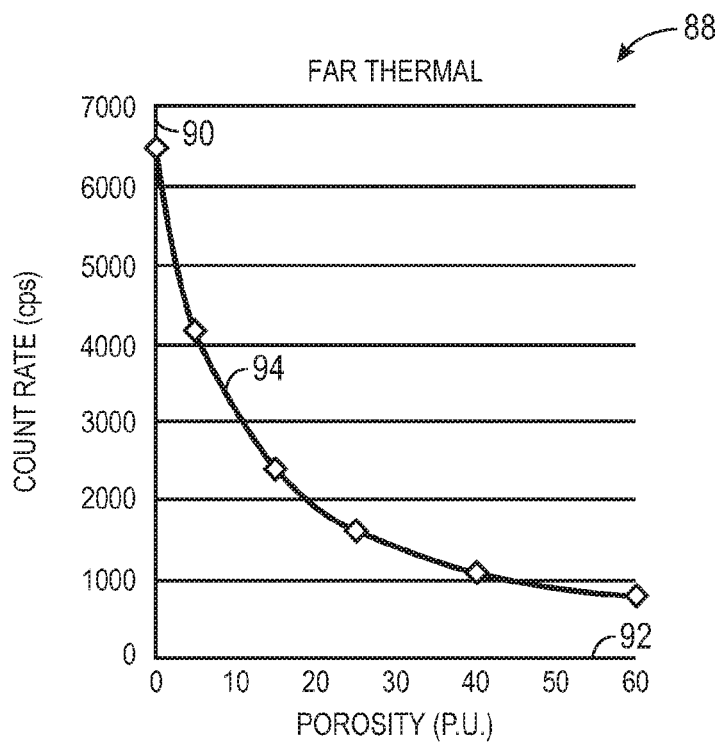
Figure 7:
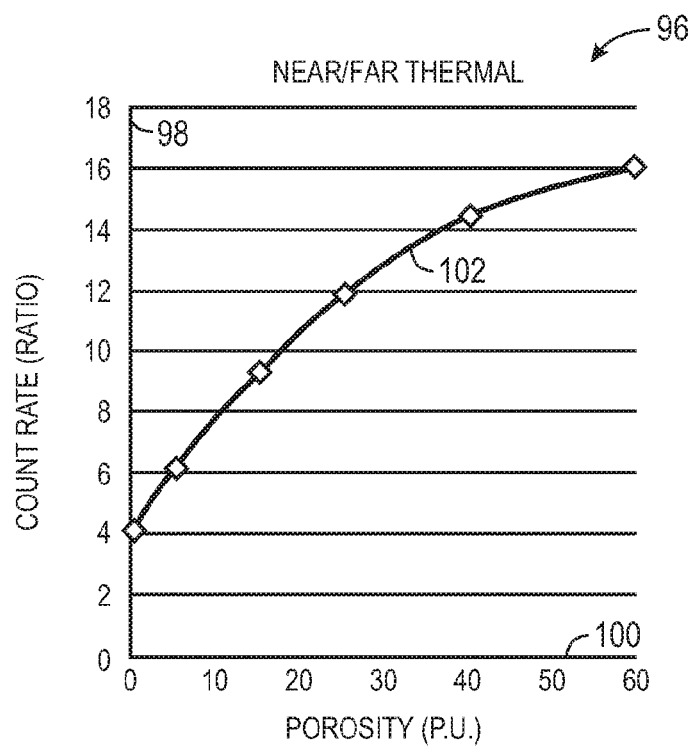
Figure 8:
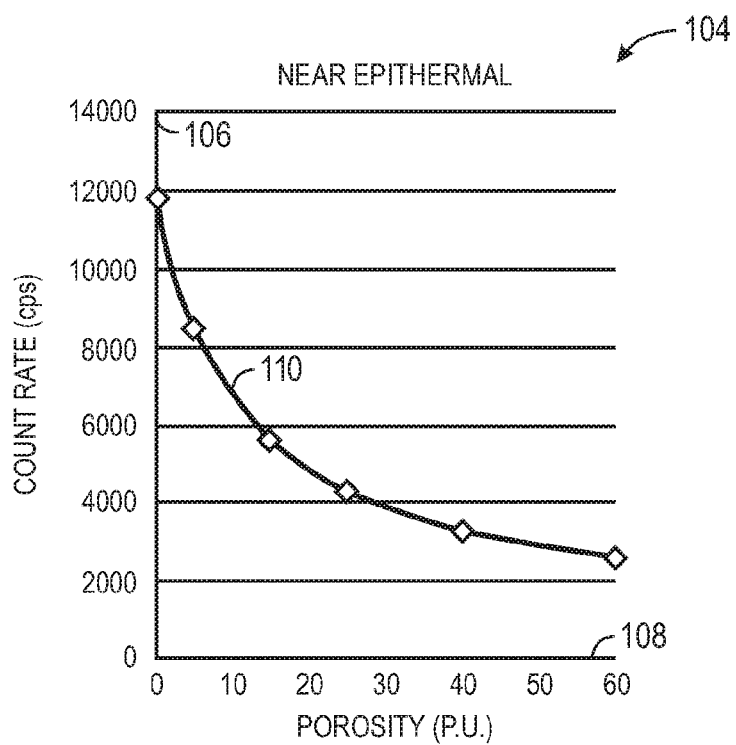
Figure 9:
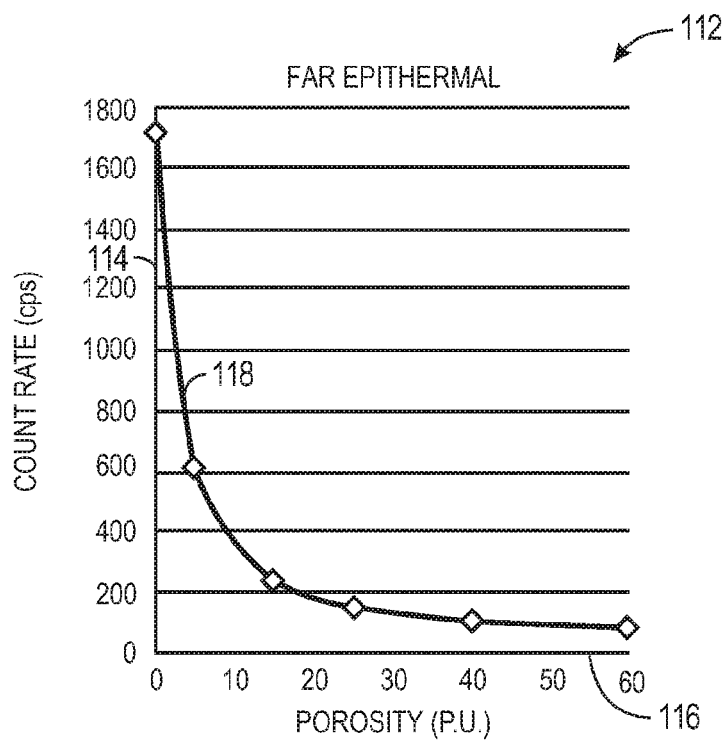
Figure 10:
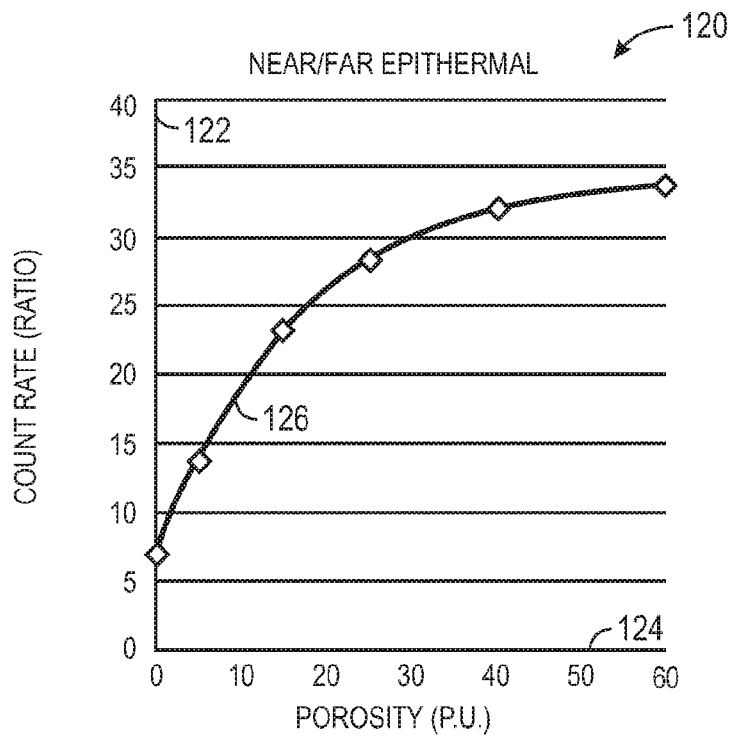

FIGS. 5-10 represent modeled plots of count rates from the near and far neutron detectors 24 and ratios of the near and far neutron detectors 24 relative to the porosity of the subterranean formation 36. In particular, FIGS. 5-7 represent count rates when the neutron detectors 24 are thermal neutron detectors, and FIGS. 8-10 represent count rates when the neutron detectors 24 are epithermal neutron detectors. The near and far source-detector spacings are approximately 1 and 2 feet, respectively. Most of the region between the neutron source 18 and the end of far detector 24 not occupied by the detectors 24 themselves is occupied by neutron shielding 20.

Turning first to FIG. 5, a plot 80 includes an ordinate 82 representing count rate in units of counts per second (cps) and an abscissa 84 representing porosity in porosity units (p.u.) for a thermal near neutron detector 24 spaced approximately 1 foot from the neutron source 18. A curve 86 illustrates a relationship between count rate and porosity obtained by the thermal near neutron detector 24 alone. FIG. 6 illustrates a plot 88, which includes an ordinate 90 of count rate in units of counts per second (cps) and an abscissa 92 of porosity in porosity units (p.u.) for a thermal far neutron detector 24 spaced approximately 2 feet from the neutron source 18. A curve 94 illustrates a relationship between count rate and porosity obtained by the thermal far neutron detector 24 alone. FIG. 7 illustrates a plot 96, which includes an ordinate 98 of a ratio of count rates and an abscissa 100 of porosity in porosity units (p.u.) for a ratio of the counts of the thermal near neutron detector 24 to those of the thermal far neutron detector 24. A curve 102 illustrates a relationship between the ratio of count rates and the porosity of the subterranean formation 36.

Turning next to FIG. 8, a plot 104 includes an ordinate 106 representing count rate in units of counts per second (cps) and an abscissa 108 representing porosity in porosity units (p.u.) for an epithermal near neutron detector 24 spaced approximately 1 foot from the neutron source 18. A curve 110 illustrates a relationship between count rate and porosity obtained by the epithermal near neutron detector 24 alone. FIG. 9 illustrates a plot 112, which includes an ordinate 114 of count rate in units of counts per second (cps) and an abscissa 116 of porosity in porosity units (p.u.) for an epithermal far neutron detector 24 spaced approximately 2 feet from the neutron source 18. A curve 118 illustrates a relationship between count rate and porosity obtained by the epithermal far neutron detector 24 alone. FIG. 10 illustrates a plot 120, which includes an ordinate 122 of a ratio of count rates in units of counts per second (cps) and an abscissa 124 of porosity in porosity units (p.u.) for a ratio of the counts of the epithermal near neutron detector 24 to those of the epithermal far neutron detector 24. A curve 126 illustrates a relationship between the ratio of count rates and the porosity of the subterranean formation 36.

Porosity may be calculated based on the count rates plotted in FIGS. 5-10. However, as illustrated by FIGS. 11 and 12, the porosity sensitivity may vary dramatically depending upon which of these count rates is used in determining the porosity.

Figure 11:
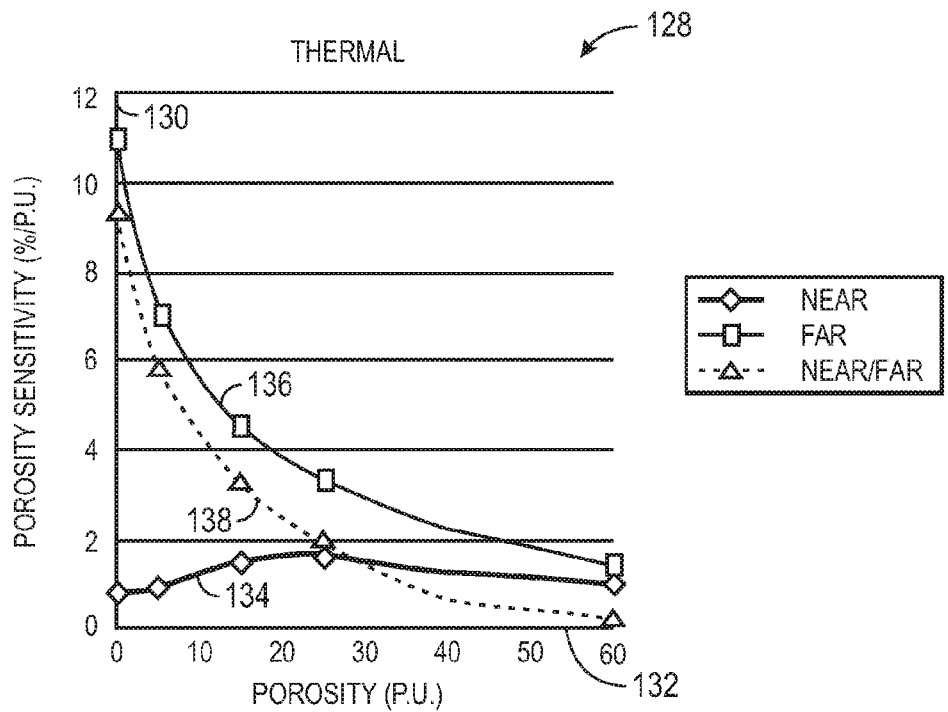
FIGS. 11 and 12 are plots modeling porosity sensitivity associated with the neutron counts of FIGS. 5-10, in accordance with an embodiment.
Figure 12:
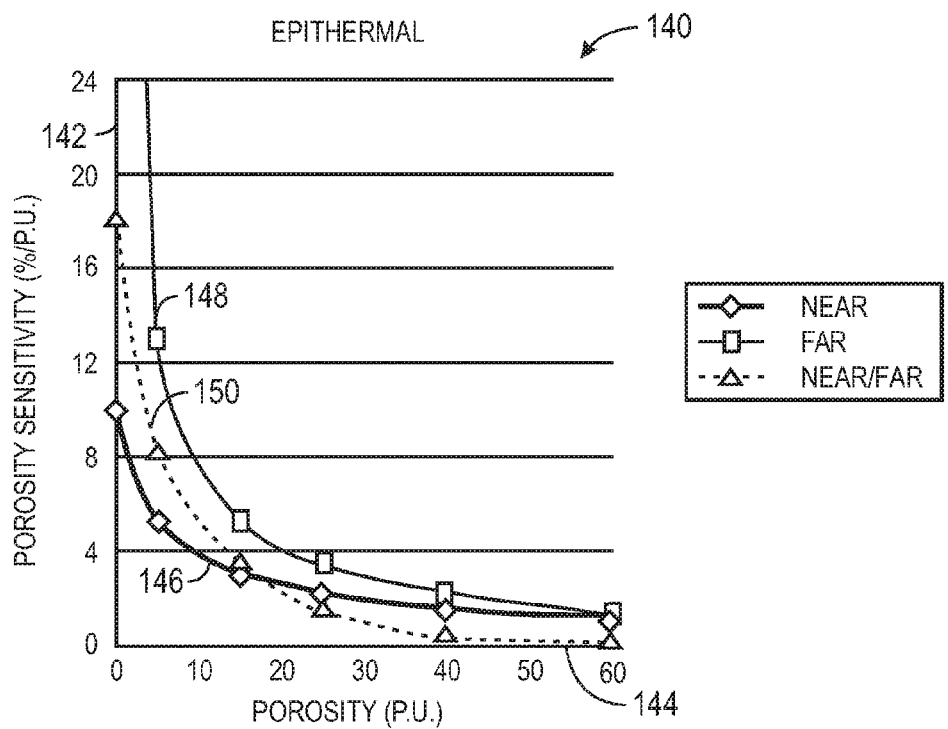

Turning to FIG. 11, a plot 128 illustrates porosity sensitivity from the neutron count rates of thermal neutron detectors 24 illustrated in FIGS. 5-7. The plot 128 includes an ordinate 130 representing porosity sensitivity in units of percent per porosity percentage unit (p.u.) (i.e., $$100 * \left( \frac{\frac{dCountRate}{dp.u.}}{CountRate} \right)$$

and an abscissa 132 representing porosity in units of porosity units (p.u.). Curves 134, 136, and 138 respectively illustrate porosity sensitivity derived from the thermal near neutron detector 24 count rate of FIG. 5 normalized to a count rate of the neutron monitor 22, the thermal far neutron detector 24 count rate of FIG. 6 normalized to the count rate of the neutron monitor 22, and the ratio of count rates of the thermal neutron detectors 24 of FIG. 7. Turning next to FIG. 12, a plot 140 illustrates porosity sensitivity from the neutron count rates of epithermal neutron detectors 24 illustrated in FIGS. 8-10. The plot 140 includes an ordinate 142 representing porosity sensitivity in units of percent per porosity percentage unit (p.u.) and an abscissa 144 representing porosity in units of porosity units (p.u.). Curves 146, 148, and 150 respectively illustrate porosity sensitivity deriving from the epithermal near neutron detector 24 count rate of FIG. 8 normalized to a count rate of the neutron monitor 22, the epithermal far neutron detector 24 count rate of FIG. 9 normalized to a count rate of the neutron monitor 22, and the ratio of count rates of the epithermal neutron detectors 24 of FIG. 10. (Note that in the near and far porosity sensitivity calculations, the neutron monitor 22 count rate used for normalization doesn't depend on porosity and thus cancels in ratio.)

The plots 128 and 140 illustrate that the normalized far neutron detector 24 counts provide higher porosity sensitivities than corresponding ratios of neutron counts from similar detectors. In particular, the thermal far neutron detector 24 porosity sensitivity curve 136 is higher at all porosities than the thermal neutron detector 24 ratio porosity sensitivity curve 138. Similarly, the epithermal far neutron detector 24 porosity sensitivity curve 148 is higher at all porosities than the epithermal neutron detector 24 ratio porosity sensitivity curve 150. Indeed, even the near neutron detector 24 porosity sensitivity curves 134 and 146 show a higher porosity sensitivity than the respective ratio porosity sensitivity curves 138 and 150 at porosities higher than approximately 25 p.u. While the exact numbers shown in the plots 128 and 140 of FIGS. 11 and 12 depend on the instrument design, including source-detector spacing, neutron detector characteristics, type and placement of neutron shielding, etc., these examples exhibit the general trends observed in such devices (i.e., that porosity sensitivity tends to increase with source-detector spacing). However, since the porosity sensitivities have the same basic behavior for both near and far detectors 24, the porosity sensitivity is reduced significantly when the ratio between the near and far detector 24 count rates is taken. The neutron monitor 22 has no porosity sensitivity since it is sensitive almost exclusively to the direct flux of neutrons from the neutron source 18. Therefore, the normalization with the neutron monitor 22 count rate preserves the porosity sensitivity of the single detectors 24.

In addition to improved porosity sensitivity, certain of the normalized counts of the neutron detectors 24 also may have improved porosity precision over the ratio of counts of the neutron detectors 24. Exemplary plots of the porosity precision of the neutron counts of FIGS. 5-10 appear in FIGS. 13 and 14. These plots show the corresponding one standard deviation porosity precision achieved with one second of data acquisition, assuming typical detector 24 sizes and source neutron 18 output. The near and far neutron detector 24 precisions are equivalent to the precision for the count rates normalized by the neutron monitor 22 count rate if it is assumed that the count rate in the neutron monitor 22 can be made much larger than the count rates in the low energy detectors 24. This is generally achievable due to the close proximity to the neutron source 18 of the neutron monitor 22.

Figure 13:
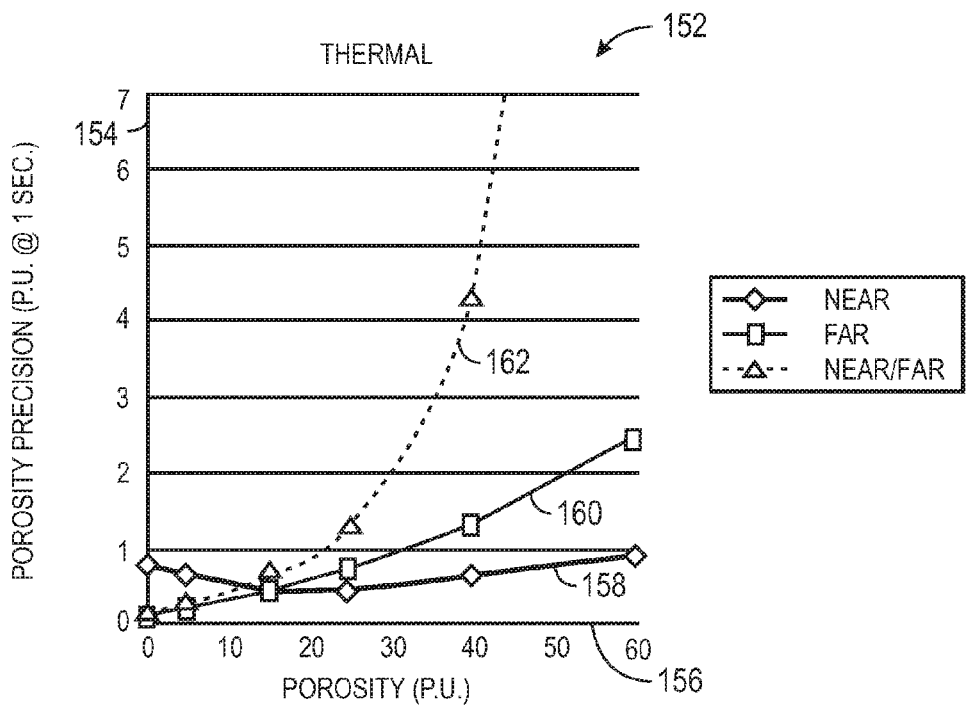
FIGS. 13 and 14 are plots modeling porosity precision associated with the neutron counts of FIGS. 5-10, in accordance with an embodiment.
Figure 14:
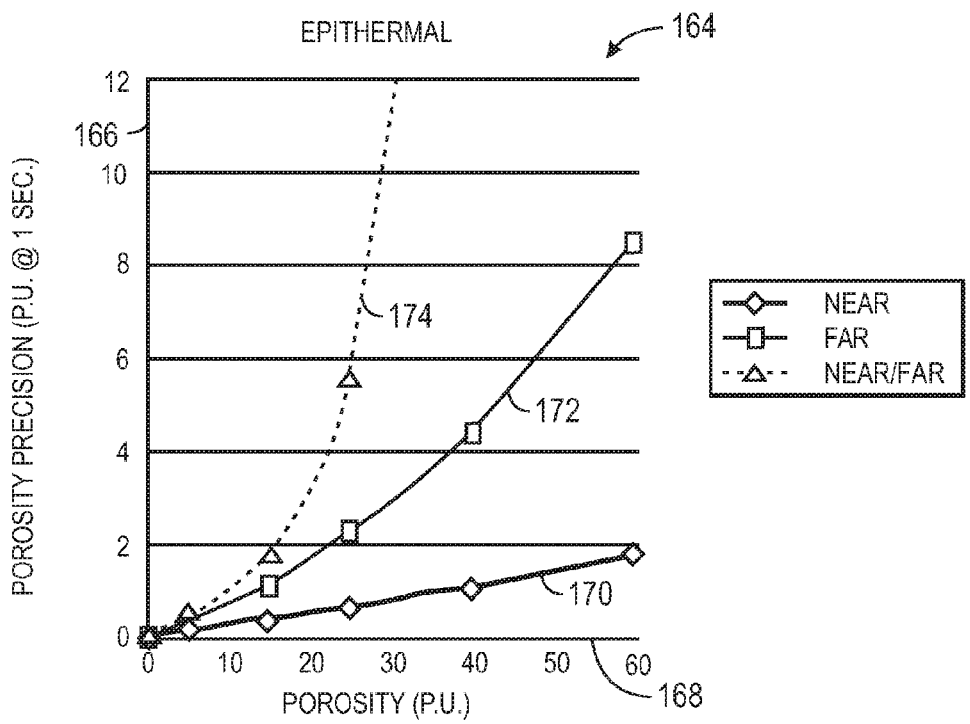

In particular, FIG. 13 is a plot 152, which represents porosity precision when porosity is determined from the neutron count rates of thermal neutron detectors 24, as illustrated in FIGS. 5-7. An ordinate 154 represents porosity precision (statistical error referred to as precision) in units of porosity units (p.u.) at one second, and an abscissa 156 represents porosity in units of porosity units (p.u.). Curves 158, 160, and 162 respectively illustrate porosity precision derived from the thermal near neutron detector 24 count rate of FIG. 5 normalized to a count rate of the neutron monitor 22, the thermal far neutron detector 24 count rate of FIG. 6 normalized to a count rate of the neutron monitor 22, and the ratio of count rates of the thermal neutron detectors 24 of FIG. 7. Similarly, FIG. 14 illustrates a plot 164, which represents porosity precision when porosity is determined from the neutron count rates of epithermal neutron detectors 24, as illustrated in FIGS. 8-10. An ordinate 166 represents porosity precision in units of porosity units (p.u.) at one second, and an abscissa 168 represents porosity in units of porosity units (p.u.). Curves 170, 172, and 174 respectively illustrate porosity precision derived from the epithermal near neutron detector 24 count rate of FIG. 8 normalized to a count rate of the neutron monitor 22, the epithermal far neutron detector 24 count rate of FIG. 9 normalized to a count rate of the neutron monitor 22, and the ratio of count rates of the epithermal neutron detectors 24 of FIG. 10.

As apparent from the plots 152 and 164, the porosity precision obtained from normalized count rates of the neutron detectors 24 may be significantly better than the porosity precision obtained from ratios of count rates of the neutron detectors 24. In particular, the thermal far neutron detector 24 porosity precision curve 160 is equal to or better at all porosities than the thermal neutron detector 24 ratio porosity precision curve 162. Similarly, the epithermal far neutron detector 24 porosity precision curve 172 and epithermal near neutron detector 24 porosity precision curve 170 may be better at all porosities than the epithermal neutron detector 24 ratio porosity precision curve 174. As also apparent from the plots 152 and 164, as porosity increases, the precisions of the ratio porosities shown in curves 162 and 174 become exponentially worse, while the precision of the porosities calculated from individual neutron detector counts degrades much less.

Overall, as can been seen from the plots 152 and 164 of FIGS. 13 and 14, the use of a neutron monitor 22 instead of another low energy neutron detector 24 to eliminate the effect of an unknown variable, neutron source 18 output, produces a dramatic improvement in measurement precision, especially at high porosity where the precision is worst. Further, it provides an even more dramatic improvement in operational efficiency, since reducing the statistical error by a factor of 2 may require increasing the measurement time by a factor of 4. This is equivalent to a potential increase in logging speed by a factor of 4 for the same statistical precision that would have been achieved using a ratio porosity measurement.

Figure 15:
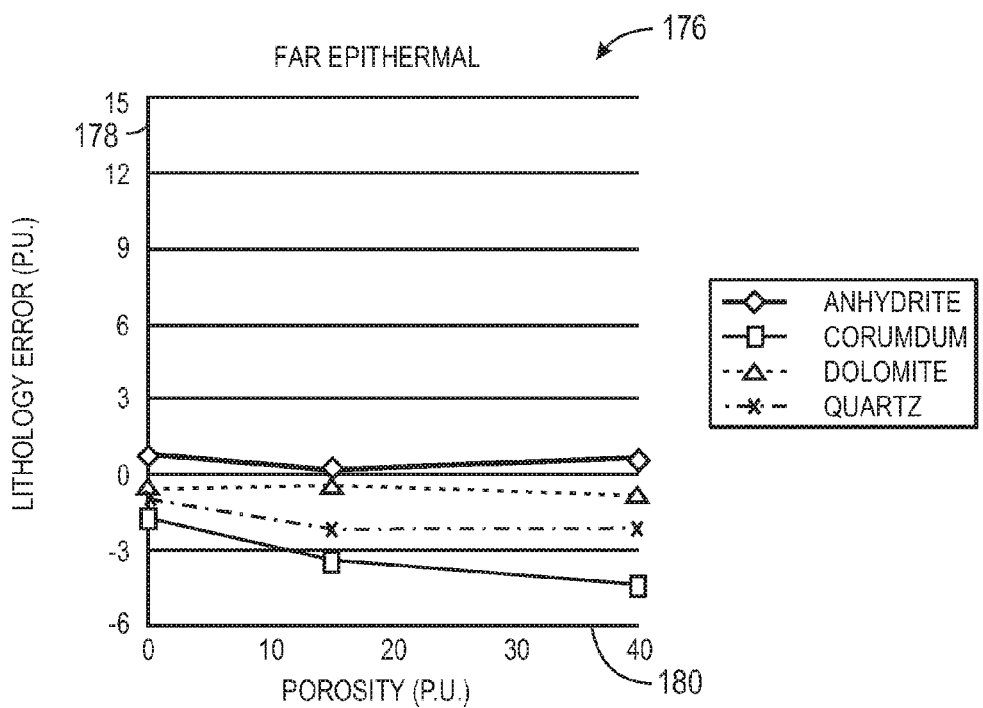
FIGS. 15 and 16 are plots modeling lithology effects arising from a single epithermal far neutron detector and from a ratio of epithermal near and far neutron detectors, respectively, in accordance with embodiments.
Figure 16:
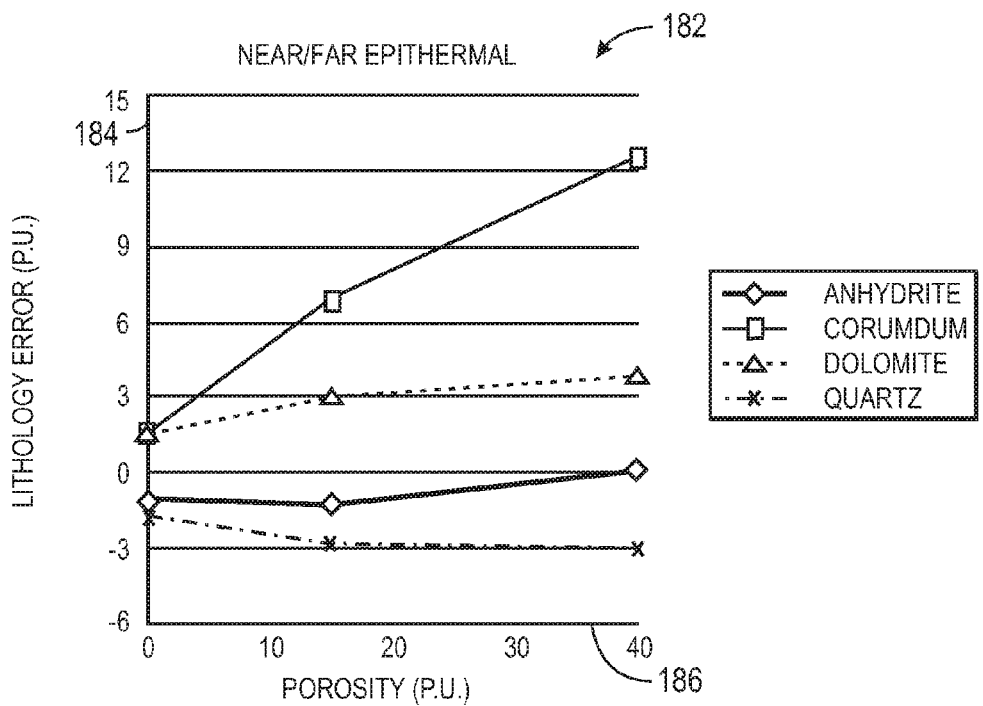

As mentioned above, obtaining porosity from a normalized count rate of neutrons from a single neutron detector 24 rather than from a ratio of neutron detectors 24 may provide improved porosity sensitivity and improved porosity precision. In addition, obtaining porosity from a normalized count rate of neutrons from a single neutron detector 24 may result in a reduction of lithology effects as compared to obtaining porosity from a ratio of neutron detectors 24. FIGS. 15 and 16 respectively offer plots illustrating the lithology effect for porosity obtained from the neutron count rate of a single epithermal far neutron detector 24 and for porosity obtained from a ratio of epithermal near neutron detector 24 count rate to the epithermal far neutron detector 24 count rate. With regard to FIGS. 15 and 16, since an epithermal spacing of about 1 foot from the neutron source 18 has been shown to minimize the lithology effect at mid to high porosities, this measurement may be used as the far spacing while the near spacing may be about ⅔ this distance from the neutron source 18.

Turning to FIG. 15, a plot 176 includes an ordinate 178, which represents lithology error compared to a calcite formation in units of porosity units (p.u.), and an abscissa 180, which represents porosity in units of porosity units (p.u.). This lithology error is the deviation between the true porosity of a formation and the one observed assuming that the formation is composed of calcite. The lithology effects introduced by several common oil well minerals that may be present in the subterranean formation 36, including anhydrite, dolomite, quartz, and also corundum, which is a convenient material for simulating high Al content formations like shales, appear in curves of the plot 176. FIG. 16 presents a similar plot 182, which includes an ordinate 184 representing lithology error in units of porosity units (p.u.), and an abscissa 186 representing porosity in units of porosity units (p.u.). The lithology effects introduced by the minerals anhydrite, corumdum, dolomite, and quartz appear in curves of the plot 182. As evident from the plots 176 and 182, certain minerals (e.g., corundum and dolomite) may introduce significantly greater lithology effects at higher porosities when porosity is determined from a ratio of counts of the neutron detectors 24 than when porosity is determined from counts of the neutron detectors 24 normalized to counts of the neutron monitor 22. Moreover, as can be seen from the plots 176 and 182, the single "optimally-spaced" neutron detector 24 of the plot 176 has much less lithology effect than the near/far ratio of the plot 182. Choosing the "other" detector 24 to be farther from the neutron source 18 (e.g., at 2 feet), rather than closer, may result in an even larger lithology error. This larger lithology error can even exceed 100 p.u., since the near/far neutron detector count rate ratio observed when the subterranean formation 36 includes some minerals, with such a neutron detector 24 spacing, can exceed that of water.

The specific embodiments described above have been shown by way of example, and it should be understood that these embodiments may be susceptible to various modifications and alternative forms. In particular, the porosity can be computed directly from the normalized count rate of a single epithermal or thermal neutron detector 24 by using a transform derived from modeled and/or experimental data that relates the measured normalized count rate to the porosity of the formation 36. The so measured porosity can further be corrected for additional environmental effects, such as borehole size, tool standoff and borehole fluid, to name a few. It should be further understood that the claims are not intended to be limited to the particular forms disclosed, but rather to cover all modifications, equivalents, and alternatives falling within the spirit and scope of this disclosure.

What is claimed is:

1. A downhole neutron porosity tool comprising:
   a neutron source configured to emit neutrons into a subterranean formation;
   a neutron monitor configured to detect a count rate of neutrons proportional to the neutrons emitted by the neutron source;

a neutron detector configured to detect a count rate of neutrons scattered off the subterranean formation;

data processing circuitry configured to determine an environmentally corrected porosity configured to be output to an operator as representative of a true porosity of the subterranean formation using neutron measurements consisting of the count rate of neutrons scattered off the subterranean formation normalized to the count rate of neutrons proportional to the neutrons emitted by the neutron source to thereby determine the environmentally corrected porosity without using a ratio of count rates from any other neutron detector ; and an output device configured to output an indication of the environmentally corrected porosity as representative of the true porosity of the subterranean formation.

2. The downhole tool of claim 1, wherein the neutron source comprises a pulsed neutron source.

3. The downhole tool of claim 1, wherein the neutron source comprises an electronic neutron generator configured to emit neutrons of approximately 14 MeV.

4. The downhole tool of claim 1, wherein the neutron monitor is configured to detect fast neutrons.

5. The downhole tool of claim 1, wherein the neutron monitor is configured to detect higher energy neutrons than the neutron detector.

6. The downhole tool of claim 1, wherein the neutron monitor is configured to detect neutrons of greater than 1 MeV and the neutron detector is configured substantially not to detect neutrons of greater than 1 MeV.

7. The downhole tool of claim 1, wherein the neutron monitor comprises a plastic scintillator.

8. The downhole tool of claim 1, wherein the neutron monitor comprises a solid state neutron detector.

9. The downhole tool of claim 1, wherein the neutron monitor comprises a He-4 gas counter, a Hydrogen proportional counter, or a liquid scintillator, or any combination thereof.

10. A method comprising:
emitting neutrons into a subterranean formation using a neutron source;
detecting a count rate of neutrons proportional to the neutrons that are emitted using a neutron monitor;
detecting a count rate of neutrons scattered off the subterranean formation using a neutron detector;
normalizing the count rate of neutrons scattered off the subterranean formation to the count rate of neutrons proportional to the neutrons that are emitted to obtain a normalized count rate of scattered neutrons using data processing circuitry;
determining an apparent porosity of the subterranean formation using neutron measurements consisting of the normalized count rate of scattered neutrons using the data processing circuitry and therefore without using a ratio of count rates from any two neutron detectors other than the neutron monitor;
applying an environmental correction to the apparent porosity of the subterranean formation to compensate for borehole effects and lithology effects using the data processing circuitry without using a ratio of count rates from any two neutron detectors other than the neutron monitor to obtain a corrected porosity of the subterranean formation, wherein the corrected porosity of the subterranean formation is configured to be output as representative of a true porosity of the subterranean formation; and
outputting the corrected porosity of the subterranean formation as representative of the true porosity of the subterranean formation in a report using a monitor or printing device coupled to the data processing circuitry.

11. The method of claim 10, wherein the apparent porosity of the subterranean formation is determined from the normalized count of scattered neutrons based at least in part on a transform derived from modeled or experimental data, or a combination thereof, that relates the normalized count of scattered neutrons to the porosity of the subterranean formation under a plurality of possible lithologies to account for lithology effects.

12. The method of claim 10, comprising detecting a count rate of neutrons that traverse through a borehole using a borehole-facing neutron detector disposed more closely to the neutron source than the neutron detector, wherein the environmental correction applied to the apparent porosity is based at least in part on the count rate of neutrons that traverse through the borehole.

13. The method of claim 10, comprising determining a borehole apparent porosity based at least in part on the count rate of neutrons that traverse through the borehole using the data processing circuitry, wherein the environmental correction applied to the apparent porosity results in the corrected porosity that is determined based at least in part on the following relationship:

$$\varphi_{corr} = \sum_{ij}^{i+j \leq n} a_{ij} \varphi_{near}^i \varphi_{back}^j,$$

wherein $\phi_{corr}$ represents the corrected porosity, $\phi_{near}$ represents the apparent porosity, $\phi_{back}$ represents the borehole apparent porosity, n represents the degree of the polynomial, and $\alpha_{ij}$ represents coefficients chosen to minimize a difference between the apparent porosity and a true porosity of the subterranean formation, wherein the borehole apparent porosity is determined using a count rate from a borehole facing neutron detector spaced more closely to the neutron source than the neutron detector.

14. A method comprising:
emitting neutrons into a subterranean formation using a neutron source;
detecting the emitted neutrons using a neutron monitor;
detecting a first count rate of neutrons scattered off the subterranean formation using a first neutron detector;
detecting a second count rate of neutrons scattered off the subterranean formation using a second neutron detector, wherein the second neutron detector is disposed farther from the neutron source than the first neutron detector;
normalizing at least one of the first count and the second count rate to the count rate of emitted neutrons using data processing circuitry;
when the first neutron detector is expected to be less affected by a lithology effect of the subterranean formation than the second neutron detector, determining a porosity of the subterranean formation using neutron measurements consisting of the normalized first count rate, and therefore without using any ratio of count rates of the first neutron detector and the second neutron detector, using the data processing circuitry;
when the second neutron detector is expected to be less affected by the lithology effect of the subterranean formation than the first neutron detector, determining the porosity of the subterranean formation using neutron measurements consisting of the normalized second count rate, and therefore without using any ratio of count rates of the first neutron detector and the second neutron detector, using the data processing circuitry; and outputting the porosity of the subterranean formation as representative of a true porosity of the subterranean formation to a monitor or printing device coupled to the data processing circuitry.

15. The method of claim 14, wherein the porosity is determined using the normalized first count rate when the first neutron detector is spaced more closely to an optimal spacing than the second neutron detector and wherein the porosity is determined using the normalized second count rate when the second neutron detector is spaced more closely to the optimal spacing than the first neutron detector.

* * * * *